though the reaction had been substantially completed at this stage, heating was still continued for some time to fully complete the reaction so that all iron ion content in the ferrous sulfate used may be converted into the magnetic iron oxide, magnetite, which is the object of the present invention, and the resulting magnetic iron oxide may be completely precipitated. The end point

United States Patent Office 3,141,738
Patented July 21, 1964

3,141,738
METHOD OF PRODUCING BLACK-COLOURED MAGNETIC IRON OXIDE
Takeo Kagitani, 244 Aoki-Nakahama-cho, Honjo-cho, Higashi-Nada-ku, Kobe-shi, Japan
No Drawing. Filed Sept. 5, 1961, Ser. No. 135,756
11 Claims. (Cl. 23—200)

This present invention relates to a method of producing black-coloured magnetic iron oxide, that is magnetite.

It is well known that a neutral or basic ferrous acetate or ferrous formate is obtained by making an alkali metal salt solution of a lower monocarboxylate such as sodium acetate solution or sodium formate solution act on a ferrous salt such as ferrous sulfate or ferrous chloride. This is nothing but a double decomposition.

The inventor of this present invention has found that an oxidation follows the double decomposition continuously, being affected by heat treatment and concentration of solution, thereby making the reaction products formed remarkably different from one another in composition, colouring and especially magnetic property, and has carried out numerous experiments along this line.

It is an object of this present invention to produce black-coloured magnetic iron oxide, that is magnetite, having desired properties, with a high yield through a simple operation. Further objects will appear from the following description.

According to the present invention, black-coloured magnetic iron oxide, that is magnetite, is produced by dissolving a ferrous compound in an aqueous solution of an alkali metal salt of a lower monocarboxylic acid and heating the solution. Preferably, a ferrous compound is dissolved in an aqueous solution of an alkali metal salt of a lower monocarboxylic acid such as sodium acetate or sodium formate, the solution having been prepared by dissolving a theoretical amount or an amount slightly in excess of the theoretical amount of the alkali metal salt in an amount of water more than ten times by weight of the amount of the alkali metal salt, and the ferrous compound solution is heated up to a rather low temperature of 70° to 100° C., being agitated with or without aeration. The product is extra-fine needle crystals. The yield is very high.

The reaction mechanism involved in the formation of black-coloured magnetic iron oxide, that is magnetite, from a ferrous salt and an alkali metal salt of a lower monocarboxylic acid through simple heating or aeration and heat treatment, is not yet clear. It is considered, however, that as shown in the following formulae, a neutral or basic ferrous monocarboxylate formed as an intermediate product is relatively quickly subjected to oxidation and may successively be converted into the black-coloured magnetic iron oxide, that is, magnetite. By way of example, the chemical reaction formulae in case sodium acetate is employed as a typical compound of an alkali metal salt of a lower monocarboxylic acid are given in the following lines.

$$FeSO_4 + 2NaC_2H_3O_2 = Fe(C_2H_3O_2)_2 + Na_2SO_4$$
$$3Fe(C_2H_3O_2)_2 + 3H_2O + \tfrac{1}{2}O_2 = Fe_3O_4 + 6CH_3COOH$$

or

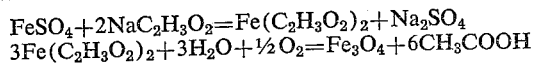
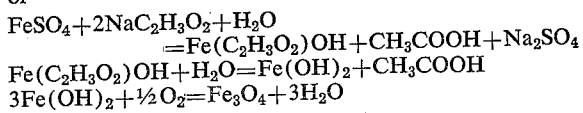

Being of high purity and of an extra-fine needle crystal structure, the black-coloured magnetic iron oxide, that is, magnetite, which is the end product of the present invention, may be used as special iron black pigment and as a magnetic powder for magnetic inspection in the field of magnetic application. Furthermore, the magnetite may extensively be useful as magnetic materials for communication instruments and sound-recording apparatus. Moreover, when the magnetite produced is roasted at a suitable temperature in the air, reddish brown γ-hematite may readily be obtained which may satisfactorily be used as the magnetic materials mentioned above.

*Example*

Into a dilute solution of sodium acetate prepared by dissolving 20 to 25 parts of sodium acetate in 200 to 2000 parts of water, 20 parts of ferrous sulfate are added little by little. When the resultant solution was heated up to 70 to 100° C., the reactive solution was first coloured dark brown and then turned blackish brown. After 2 to 3 hours, the reactive solution was completely black-coloured and a black precipitate was formed. Although the reaction had been substantially completed at this stage, heating was still continued for some time to fully complete the reaction so that all iron ion content in the ferrous sulfate used may be converted into the magnetic iron oxide, magnetite, which is the object of the present invention, and the resulting magnetic iron oxide may be completely precipitated. The end point of the reaction may clearly be discerned by disappearance of the blue coloration peculiar to ferrous ion, the blue coloration being caused by the potassium ferricyanide solution indicator.

The black precipitate thus formed was filtered, washed with water and dried finally. The yield was 5 to 6 parts. This value means a good rate of yield because it corresponds to more than 98 percent of the theoretical value.

Although I have shown and described a certain specific embodiment of my invention, I am fully aware that many modifications thereof are possible. My invention, therefore, is not to be restricted except insofar as is necessitated by the prior art or by the spirit of the annexed claims.

What I claim is:

1. The method of producing black-coloured magnetic iron oxide, which is magnetite, which consists in dissolving a ferrous compound which is a member of the group consisting of ferrous sulfate and ferrous chloride in substantially theoretical amount in an aqueous solution of an alkali metal salt of a lower monocarboxylic acid which is a member of the group consisting of sodium acetate and sodium formate, and heating the solution with aeration to substantially 70–100° C., the amount of the water constituting the aqueous solution being more than ten times by weight the amount of the alkali salt.

2. The method of producing black-coloured magnetic iron oxide, which is magnetite, which consists in dissolving a ferrous compound which is a member of the group consisting of ferrous sulfate and ferrous chloride in substantially theoretical amount in an aqueous solution of sodium acetate, and heating the solution with aeration to substantially 70–100° C., the amount of the water constituting the aqueous solution being more than ten times by weight the amount of the sodium acetate.

3. The method of producing black-coloured magnetic iron ore, which is magnetite, which consists in dissolving a ferrous compound which is a member of the group consisting of ferrous sulfate and ferrous chloride in substantially theoretical amount in an aqueous solution of sodium formate, and heating the solution with aeration to substantially 70–100° C., the amount of the water constituting the aqueous solution being more than ten times by weight the amount of the sodium formate.

4. The method of producing black-coloured magnetic iron oxide, which is magnetite, which consists in dissolving ferrous chloride in substantially theoretical amount in an aqueous solution of sodium acetate, and heating the solution with aeration to substantially 70–100° C., the amount of the water constituting the aqueous solution being more than ten times the weight of the sodium acetate.

5. The method of producing black-coloured magnetic iron oxide, which is magnetite, which consists in dissolving ferrous sulfate in substantially theoretical amount in an aqueous solution of sodium formate, and heating the solution with aeration to substantially 70–100° C., the amount of the water constituting the aqueous solution being more than ten times the weight of the sodium formate.

6. The method of producing black-coloured magnetic iron oxide which is magnetite, which consists in dissolving in substantially theoretical amount a ferrous compound which is a member of the group consisting of ferrous sulfate and ferrous chloride in an aqueous solution of a member of the group consisting of sodium acetate and sodium formate, and heating the solution to substantially 70–100° C., the amount of the water constituting the aqueous solution being more than ten times the weight of the sodium compound.

7. The method of producing black-coloured magnetic iron oxide which is magnetite, which consists in dissolving ferrous sulfate in substantially theoretical amount in an aqueous solution of a member of the group consisting of sodium acetate and sodium formate, and heating the solution to substantially 70–100° C., the amount of the water constituting the aqueous solution being more than ten times the weight of the sodium compound.

8. The method of producing black-coloured magnetic iron oxide which is magnetite, which consists in dissolving ferrous chloride in substantially theoretical amount in an aqueous solution of a member of the group consisting of sodium acetate and sodium formate, and heating the solution to substantially 70–100° C., the amount of the water constituting the aqueous solution being more than ten times the weight of the sodium compound.

9. The method of producing black-coloured magnetic iron oxide which is magnetite, which consists in dissolving ferrous sulfate in substantially theoretical amount in an aqueous solution of sodium acetate, and heating the solution to substantially 70–100° C., the amount of the water constituting the aqueous solution being more than ten times the weight of the sodium acetate.

10. The method of producing black-coloured magnetic iron oxide which is magnetite, which consists in dissolving ferrous sulfate in substantially theoretical amount in an aqueous soluiton of sodium formate, and heating the solution to substantially 70–100° C., the amount of the water constituting the aqueous solution being more than ten times the weight of the sodium formate.

11. The method of producing magnetite which consists in dissolving 20 to 25 parts of sodium acetate in 200 to 2000 parts of water, adding gradually substantially 20 parts of ferrous sulfate, and heating to a temperature of 70 to 100° C. for two to three hours, the parts being by weight.

References Cited in the file of this patent

UNITED STATES PATENTS 2,694,656　Camras _____ Nov. 16, 1954

OTHER REFERENCES

Mellor: Comprehensive Treatise on Inorganic and Theoretical Chemistry, Longmans, Green & Co., New York, vol. 13, (part 2), pages 738 to 740 (1934).